(12) United States Patent
Gallegos et al.

(10) Patent No.: US 9,309,152 B2
(45) Date of Patent: Apr. 12, 2016

(54) PROCESS FOR DRYING CONCRETE DISPERSANTS

(75) Inventors: Pedro Gallegos, Santiago de Chile (CL); Lili Arancibia, Ñuñoa-Santiago (CL); Hugo Olivares, Santiago Centro (CL); Ernesto Croquevielle, Santiago de Chile (CL); Thomas Haack, Santiago de Chile (CL)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/235,597

(22) PCT Filed: Jul. 31, 2012

(86) PCT No.: PCT/EP2012/064969
§ 371 (c)(1),
(2), (4) Date: Jan. 28, 2014

(87) PCT Pub. No.: WO2013/020862
PCT Pub. Date: Feb. 14, 2013

(65) Prior Publication Data
US 2014/0135427 A1   May 15, 2014

(30) Foreign Application Priority Data
Aug. 10, 2011   (EP) .................................... 11177136

(51) Int. Cl.
    C04B 24/30    (2006.01)
    C04B 40/00    (2006.01)
    C04B 103/48   (2006.01)
(52) U.S. Cl.
    CPC ........... *C04B 24/305* (2013.01); *C04B 40/0042* (2013.01); *C04B 2103/48* (2013.01); *Y10T 428/2982* (2015.01)

(58) Field of Classification Search
    None
    See application file for complete search history.

(56) References Cited

U.S. PATENT DOCUMENTS

| 3,784,648 | A | 1/1974 | Bergmeister et al. |
| 6,437,027 | B1 | 8/2002 | Isomura et al. |
| 6,620,879 | B1* | 9/2003 | Albrecht et al. .............. 524/522 |
| 2004/0072939 | A1* | 4/2004 | Cornman et al. ............. 524/502 |
| 2006/0229388 | A1 | 10/2006 | Kawakami et al. |

(Continued)

FOREIGN PATENT DOCUMENTS

| DE | 2 049 114 | 4/1972 |
| DE | 3 143 070 A1 | 5/1983 |
| DE | 100 15 135 A1 | 10/2001 |

(Continued)

OTHER PUBLICATIONS

Jan. 2, 2013 Search Report issued in International Patent Application No. PCT/EP2012/064969.

(Continued)

*Primary Examiner* — Vu A Nguyen
(74) *Attorney, Agent, or Firm* — Oliff PLC

(57) ABSTRACT

A process for the production of a solid dispersant for a hydraulically binding composition includes the steps of: providing at least one first polymer, which is a comb polymer having a polymer backbone comprising carboxyl groups; providing at least one second polymer, which is a condensate of, at least, an aromatic compound and formaldehyde; or a lignosulfonate; preparing an aqueous solution comprising the first and the second polymer; and spray-drying the aqueous solution to obtain the solid dispersant.

21 Claims, 3 Drawing Sheets

(56) References Cited

U.S. PATENT DOCUMENTS

2008/0300344 A1   12/2008   Georges et al.
2011/0054081 A1*   3/2011   Dierschke et al. ............ 524/2

FOREIGN PATENT DOCUMENTS

| EP | 753488 A2 * | 1/1997 | ............ C04B 24/26 |
| EP | 1 348 729 A1 | 10/2003 | |
| EP | 1 138 697 B1 | 11/2003 | |
| EP | 1 061 089 B1 | 3/2004 | |
| EP | 1 829 839 A1 | 9/2007 | |
| JP | 2008-208016 A | 9/2008 | |
| WO | WO 95/09821 A2 | 4/1995 | |
| WO | WO 97/35814 A1 | 10/1997 | |
| WO | WO 03/097721 A1 | 11/2003 | |
| WO | WO 2005/090416 A1 | 9/2005 | |
| WO | WO 2006133933 A2 * | 12/2006 | ............ C04B 24/26 |
| WO | WO 2011/029711 A1 | 3/2011 | |

OTHER PUBLICATIONS

Jan. 2, 2013 Written Opinion issued in International Patent Application No. PCT/EP2012/064969.

May 15, 2015 Office Action issued in Chinese Application No. 201280038942.8.

Jan. 5, 2016 Office Action issued in Japanese Application No. 2014-524331.

Feb. 1, 2016 Office Action issued in Chinese Application No. 201280038942,8.

* cited by examiner

PROCESS FOR DRYING CONCRETE DISPERSANTS

The invention relates to processes for the production of solid dispersants for a hydraulically binding composition, solid dispersants obtained according to such processes and uses thereof.

STATE OF THE ART

Dispersants are important additives for hydraulically binding compositions, such as cements. They are added to improve the workability of hydraulically binding compositions and the mechanical properties of the resulting concrete. An important class of dispersants are fluidizers, also referred to as plasticizers. Fluidizers are added in order to reduce the water content of hydraulically binding compositions. By reducing the water content, concretes with improved mechanical properties, such as pressure resistance and tightness against liquids are obtainable. Typical dispersants with fluidizing properties are organic polymers. In concrete production, melamine sulfonates, naphthalene sulfonates, lignin sulfonates or derivatives thereof are well known fluidizers. These dispersants mostly increase the initial flow of mortar compositions after preparations. However, they tend to decrease the flow shortly after, for example after about 30 min or 60 min. Thus they are of limited use for large scale applications, in which a good workability of the mortar is required over an extended time period.

In the last years, a new class of highly efficient dispersants with fluidizing properties emerged, which are organic comb polymers with a polycarboxylate backbone. The polycarboxylate backbone is covalently linked to side chains by ether, ester or amide bonds. The side chains usually comprise polyether groups. Such dispersants are also referred to as polycarboxylate ethers or esters (PCE) or as superfluidizers. Modifications and derivatives have been described, which confer specific properties to various hydraulically binding compositions.

The building industry requires large amounts of such comb polymer superfluidizers for concrete. Comb polymers are synthesized in aqueous solution. Aqueous solutions comprising about weight 40% comb polymers are commercially available.

Such comb polymers are highly hydrophilic. Upon removal of water from an aqueous comb polymer solution, a waxy or syrup-like composition is obtained. Such a waxy composition is not well suited for technical application, because the workability is low and partitioning and distribution of the polymer into a cement composition is difficult and time-consuming.

For transport or storage, it would thus be desirable to provide such superfluidizers in a dry solid state, such as a powder or granulate. In view of the overall high amounts of superfluidizers required for concrete production, a solid superfluidizer would significantly reduce the costs for transport and storage and the ease of handling.

In the prior art, various approaches have been described to obtain dry solid comb polymer compositions.

US 2006/0229388 A1 describes the problem of drying polycarboxylic acid type cement dispersants. As a solution, it suggests to include specific polyalkylene imine modifications into the chemical structure of the comb polymers. However, such chemical modifications are problematic, because they affect the properties of the comb polymer, require complicated organic synthesis processes and are not applicable for all types of comb polymer superfluidizers.

EP 1829839 A1 discloses the preparation of a powdered polycarboxylic acid-based cement dispersant, wherein the drying process is carried out with a mixture of a comb polymer with an inorganic powder. In addition, silica is added during the drying process. Again, specific chemical modifications of the comb polymers are required, namely polyamide-polyamine modifications. Besides, inorganic additives and silica in the dry comb polymer composition may affect the cement composition.

U.S. Pat. No. 6,437,027 B1 suggests a process for producing a powdery dispersant, in which a reducing agent, specifically sulfite, nitrite and thiosulfate salts, are added to a comb polymer and in which the comb polymer comprises specific chemical modifications.

As mentioned above, naphthalene sulfonates are used as dispersants for hydraulically binding compositions for their fluidizing properties for improving the initial flow. It is also known in the art that some polymer dispersions can be dried if admixed with such naphthalene sulfonate condensates. Such processes are disclosed in DE 2049114, DE 3143070 or WO 03/097721. Polymer dispersions, also named latex, comprise solid particles of water-insoluble polymers, especially thermoplastic polymers. Polymer dispersions of thermoplastic polymers can be dried easily. They are chemically and physically very different from water-soluble hydrophilic comb polymers.

WO2011/029711 discloses a formulation containing a) at least one component having dispersing properties and being selected from branched comb polymers having polyether side chains, a naphthalene sulphonate-formaldehyde condensate and a melamine sulphonate-formaldehyde condensate, and b) a phosphatized polycondensate. All inventive examples relate to liquid aqueous formulations comprising the phosphatized polycondensate b) and a single dispersant a). A mixture of two dispersants a) is used only in comparative example C4, but does not yield a stable solution, but a gel.

Problem Underlying the Invention

The subject of the invention is to provide methods and solid comb polymer based dispersants, which overcome the above-mentioned drawbacks. The invention shall provide a simple and efficient method for providing solid comb polymers dispersants for hydraulically binding compositions. The dispersants and compositions shall have high workability. Preferably, they shall be in a form which can be portioned and mixed easily, preferably a fine powder. The comb polymer dispersant shall have good fluidizing properties in hydraulically binding compositions and confer advantageous mechanical properties to the resulting concrete. Specifically, they should confer good initial flow to a mortar composition, but also preserve good flow after extended time, such as 30 min or 60 min.

It is a further problem underlying the invention to provide a method for drying such dispersants, which is usable for a broad range of comb polymers. The inclusion of additives, which do not have fluidizing properties and which might affect the cement compositions or the concrete, shall be avoided. Specifically, chemical modifications of the comb polymers, which affect their structure and properties and require a complicated organic synthesis, shall be avoided.

DISCLOSURE OF THE INVENTION

Surprisingly, it was found that the problem underlying the invention is overcome by methods, solid dispersants and uses according to the claims. Further embodiments of the invention are outlined throughout the description.

Subject of the invention is a process for the production of a solid dispersant for a hydraulically binding composition, comprising the steps of a) providing at least one first polymer, which is a comb polymer having a polymer backbone comprising carboxyl groups, b) providing at least one second polymer, which is a condensate of at least an aromatic compound and formaldehyde; or a lignosulfonate, c) preparing an aqueous solution comprising the first and the second polymer, and d) spray-drying the aqueous solution to obtain the solid dispersant.

The invention provides a solid dispersant for a hydraulically binding composition. According to the invention, the solid dispersant is dry. In other words, the water content is low, preferably below 2 wt. %, below 1 wt. % or below 0.5 wt. %. Preferably, the solid dispersant is a powder.

According to the invention, a "dispersant" is an additive for a hydraulically binding composition, which improves its workability. Specifically, the dispersant of the invention is a fluidizer or plasticizer. Since it contains comb polymer superfluidizers, it is also a superfluidizer.

According to the invention, a "hydraulically binding composition" is a composition, which comprises a binder, which hardens in the presence of water. Such compositions and binders are well-known to the skilled person in the technical field of construction. Such binders are typically inorganic binders. Preferably, the binder is selected from the group consisting of cement, gypsum, preferably in the form of anhydrous or semi-hydrous gypsum, and lime, especially burnt lime. An especially preferred hydraulic binder is cement. The compositions may comprise fillers, such as fly ash, silica fume, slack, slack cent or lime filler.

The hydraulically binding composition comprises at least one first polymer, which is a comb polymer. The comb polymer has a polymer backbone, which comprises carboxyl groups. The first polymer is a dispersant for a hydraulically binding composition. Specifically, it is a fluidizer, more specifically a superfluidizer. It is known in the art that such "superfluidizers" or "ultra-high water reducers" can confer a water reduction of more than 20% to a hydraulically binding composition, such as cement.

Comb polymer superfluidizers for hydraulically binding compositions are well known in the art. It is assumed the carboxyl groups of the backbone are adsorbed by the binder particles, whereas the side chains are oriented away from the binder particles. Thus the fluidizing properties seem to be conferred to the binder particles by steric repulsion of the side chains, and thus the particles, away from each other.

In a preferred embodiment of the invention, the backbone of the comb polymer is a polycarboxylic acid and at least some of the side chains of the comb polymer are polyethers. Preferably, the polyethers are polyethyleneglycol and/or polypropyleneglycol, or at least comprise polyethyleneglycol or polypropyleneglykol structural units.

Preferably, the side chains are covalently linked to the polycarboxylic acid backbone by ester, ether and/or amide bonds. Such comb polymers are known in the art as polycarboxylate esters or polycarboxylate ethers (PCEs).

Preferably, the polycarboxylic acid is polyacrylic acid, polymethacrylic acid or a copolymer of acrylic acid and methacrylic acid. In addition, other monomeric units may be included into the polycarboxylic acid backbone, such as organic acids, preferably dicarboxylic acids, such as maleic acid, or fatty acids.

The comb polymer may be provided in the form of a salt (with neutralized carboxyl groups), a free acid, or partially neutralized. Preferably, the comb polymer is neutralized or at least partially neutralized, because the solubility in aqueous solution is higher and the ionic carboxyl groups are advantageous for the dispersant function.

Preferably, the comb polymer comprises or consists of:

a) a molar parts of a structural unit S1 of formula I

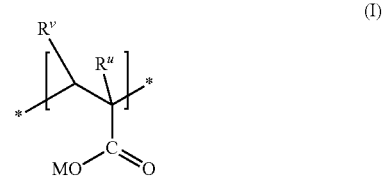

b) b molar parts of a structural unit S2 of formula II

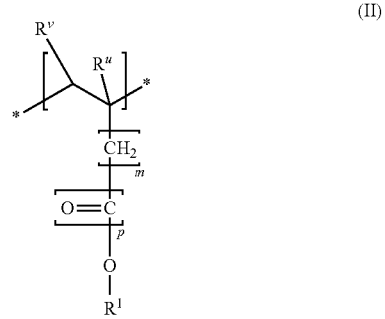

c) c molar parts of a structural unit S3 of formula III

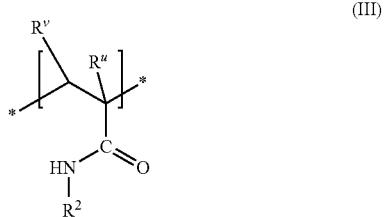

d) d molar parts of a structural unit S4 of formula IV

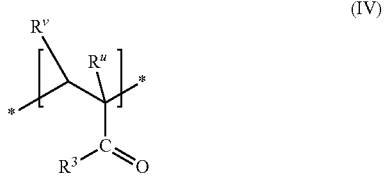

wherein each M independently from each other represents $H^+$, an alkali metal ion, an alkaline earth metal ion, a di- or trivalent metal ion, an ammonium ion or an organic ammonium group, each $R^u$ independently from each other represents Hydrogen or a methyl group, each $R^v$ independently from each other represents Hydrogen or COOM, m=0, 1 or 2, p=0 or 1, each $R^1$ and each $R^2$ independently from each other represents $C_1$- to $C_{20}$-alkyl, -cycloalkyl, -alkylaryl or for -[AO]$_n$—$R^4$, whereby A=$C_2$- to $C_4$-alkylene, $R^4$ represents H, $C_1$- to $C_{20}$-alkyl, -cyclohexyl or -alkylaryl, and n=2-250, each $R^3$ independently of the others represents $NH_2$, —$NR^5R^6$, —$OR^7NR^8R^9$, wherein $R^5$ and $R^6$ independently from each other stand are $C_1$- to $C_{20}$-alkyl, -cycloalkyl is -alkylaryl or -aryl, or for a hydroxyalkyl- or acetoxyethyl-($CH_3$—CO—O—$CH_2$—$CH_2$—) or hydroxyisopropyl-(HO—CH($CH_3$)—$CH_2$—) or acetoxyisopropyl group ($CH_3$—CO—O—CH($CH_3$)—$CH_2$—);

or $R^5$ and $R^6$ together form a ring of which the nitrogen is part, to form a morpholine or imidazoline ring, $R^7$ is a $C_2$-$C_4$ alkylene group, each $R^8$ and $R^9$ independently from each other represent $C_1$- to $C_{20}$-alkyl, -cycloalkyl, -alkylaryl, -aryl or a hydroxyalkyl group, and whereby a, b, c and d stand for the molar parts of the structural units S1, S2, S3 and S4, with a/b/c/d=(0.1-0.9)/(0.1-0.9)/(0-0.8)/(0.0-0.8), in particular a/b/c/d=(0.3-0.9)/(0.1-0.7)/(0-0.6)/(0.0-0.4)

and with the provision that a+b+c+d=1.

Thereby, comb polymers with n=8-200, more preferably n=11-150, most preferably n=20-70, turned out to be advantageously.

In particular, the molar parts of the structural units S1, S2, S3 and S4 are chosen as follows: a/b/c/d=(0.1-0.9)/(0.1-0.9)/(0-0.5)/(0-0.1), preferably a/b/c/d=(0.1-0.9)/(0.1-0.9)/(0-0.3)/(0-0.06). Furthermore, comb polymers with c+d>0 are preferred.

According to an advantageous embodiment, $R^u$ represents a methyl group, $R^v$ stands for hydrogen, m=0, p=1 and $R^1$ represents -[AO]$_n$—$R^4$ with n=20-70.

Preferably, A in -[AO]$_n$—$R^4$ represents a $C_2$-alkylene.

Preferably, the average molecular weight (Mw) of the comb polymer is 5'000-150'000 g/mol, in particular 10'000-100'000 g/mol. The average molecular weight is in particular measured using gel permeation chromatography (GPC) with polyethylenglycol (PEG) as standard.

In particular, the structural units S1, S2, S3, and S4 together have a combined molecular weight, which amounts to at least 50 wt.-%, in particular at least 90 wt.-%, preferably at least 95 wt.-%, of the total weight of the comb polymer.

For example, such comb polymers are those as disclosed in US 2006/0229388 A1.

Methods for producing such comb polymers are known in the art. Two main methods are industrially used for synthesizing such comb polymers. The first method is radical polymerisation of ethylenically unsaturated monomers. Side chains of the resulting comb polymer are already attached to monomer units. Comb polymers with a desired structure and properties are obtained by specific selection and ratio of the monomers, especially the amount of acrylic and methacrylic acid monomers in the polymerization reaction solution.

In a second method known as polymer analogous reaction, a polycarboxylic acid backbone is synthesized in a first step. Subsequently, side chains are attached to the polycarboxylic acid backbone, for example by esterification, amidation or etherisation reactions with alcohols, amines and the like. Such polymer analogous reactions, as well as resulting comb polymers, are described, for example, in WO 97/35814, WO 95/09821, DE 100 15 135 A1, EP 1 138 697 A1, EP 1 348 729 A1 and WO 2005/090416. Details about the polymer analogous reaction are disclosed, for example, in EP 1 138 697 B1 on page 7, line 20 to page 8, line 50, as well as in its Examples, or in EP 1 061 089 B1 on page 4, line 54 to page 5, line 38 as well as in its Examples. In a preferred embodiment of the invention, the comb polymers are those which were obtained by polymer analogous reaction.

According to the invention, the second polymer is a condensate of at least an aromatic compound with formaldehyde, or is a lignosulfonate. As the first polymer, the second polymer is a dispersant for a hydraulically binding composition, preferably a fluidizer. Such compounds are also referred to as "high water reducers". Condensates of aromatic compounds with formaldehyde, as well as lignosulfonates, are known dispersants or fluidizers for hydraulically binding compositions. Typically, they confer a water reduction of about 10% to 20% to a hydraulically binding composition, specifically cement.

As used herein, a "condensate" is a compound, which was obtained by at least one condensation reaction. Typically, the synthesis of such condensates comprises a subsequent polymerisation step from condensate precursor units. Since the condensation reaction yields condensates of multiple monomeric precursors, the overall reaction is a polymerization reaction and the condensate is a polymer. As used herein, a "polymer" is obtained by polymerization, but may comprise only a low number of monomeric units, such as 2 or 3 monomeric units.

In a preferred embodiment of the invention, the second polymer is a sulfonate. Sulfonates are anions with the general formula R—$SO_2O^-$, wherein R is an organic residue, such as methyl or phenyl. Sulfonates are the conjugate bases of sulfonic acids with formula $RSO_2OH$.

Specifically, the second polymer is a melamine sulfonate, naphthalene sulfonate or lignin sulfonate. Preferably, it is a melamine sulfonate formaldehyde condensate, a naphthalene sulfonate formaldehyde condensate, or a lignosulfonate. The condensates may comprise additional chemical moieties which were included by condensation, or other modifications.

It is especially preferred that the second polymer is a melamine-sulfonate-formaldehyde condensate. Preferably, the condensate comprises between about 2 to 50, more preferably between about 3 to 20 melamine subunits. Preferably, the second polymer is a linear polymer. Specifically, the melamine subunits are aligned in a linear molecular chain. The condensate may be synthesized in a multiple step reaction, in which at first melamine is reacted with formaldehyde and pyrosulfite, and subsequently sulfonated with sulfanilic acid, to obtain a primary condensate. The primary condensate is of relatively small size and may comprise an average of about two melamines per molecule. Subsequently, the primary condensates can be polymerized to obtain a condensate of desired length. Melamine-sulfonate-formaldehyde condensates are known dispersants for cement compositions. Such condensates are commercially available, for example under the trademark Sikament from Sika, CH.

In another embodiment of the invention, the second polymer is a naphthalene sulfonate formaldehyde condensate. Similar as described above for the melamine condensate, the naphthalene condensate is obtained from formaldehyde and naphthalene and sulfonated in order to introduce a desired amount of sulfonic groups. Such naphthalene sulfonates are also known dispersants for hydraulically binding compositions, specifically as fluidizers.

In another embodiment of the invention, the second polymer is a lignosulfonate. Lignosulfonates are water-soluble anionic polymers, which are by-products from the production of wood pulp. They are also used as dispersants and fluidizers for hydraulically binding compositions.

In a preferred embodiment of the invention, the average molecular weight (Mw) of the condensate is 1'000-50'000 g/mol, in particular 2'000-10'000 g/mol.

The condensate is in the form of a salt (with neutralized carboxyl groups), a free acid, or partially neutralized. Preferably, the condensate is neutralized or at least partially neutralized, because the solubility in aqueous solution is higher and ionic carboxyl groups are advantageous for the dispersant function.

In a specific embodiment, the second polymer provided in step b) is not phosphatized. More specifically, the second polymer provided in step b) is preferably not a polycondensation product containing (I) at least one structural unit with an aromatic or heteroaromatic sub-unit and at least one polyether side chain, and (II) at least one phosphated structural unit with an aromatic or heteroaromatic sub-unit.

Still more specifically, the second polymer provided in step b) preferably is not a phosphatized polycondensate according to WO2011/029711, claim 1, b). In this embodiment, the second polymer is thus preferably not a polycondensation product containing (I) at least one structural unit with an aromatic or heteroaromatic sub-unit and at least one polyether side chain, and (II) at least one phosphated structural unit with an aromatic or heteroaromatic sub-unit, and (III) at least one structural unit with an aromatic or heteroaromatic sub-unit; structural unit (II) and structural unit (III) differing exclusively in that the $OP(OH)_2$ group of the structural unit (II) is replaced by H in structural unit (III), and structural unit (III) is not the same as structural unit (I).

In a specific embodiment, the spray-dried solution and/or the solid dispersant produced according to the inventive process do not comprise a phosphatized polycondensate. More specifically, the spray-dried solution and/or solid dispersant produced according to the inventive process preferably do not comprise a polycondensation product containing (I) at least one structural unit with an aromatic or heteroaromatic sub-unit and at least one polyether side chain, and (II) at least one phosphated structural unit with an aromatic or heteroaromatic sub-unit.

Still more specifically, the spray-dried solution and/or solid dispersant produced according to the inventive process do not comprise a phosphatized polycondensate according to WO2011/029711, claim 1, b). In this embodiment, the spray-dried solution and/or solid dispersant produced according to the inventive process preferably do not comprise not a polycondensation product containing (I) at least one structural unit with an aromatic or heteroaromatic sub-unit and at least one polyether side chain, and (II) at least one phosphated structural unit with an aromatic or heteroaromatic sub-unit, and (III) at least one structural unit with an aromatic or heteroaromatic sub-unit; structural unit (II) and structural unit (III) differing exclusively in that the $OP(OH)_2$ group of the structural unit (II) is replaced by H in structural unit (III), and structural unit (III) is not the same as structural unit (I).

According to the invention, an aqueous solution is prepared, which comprises the first and second polymer. The solution may comprise two or more different first polymers and/or second polymers. If necessary the aqueous solution is mixed, for example stirred, until the comb polymers and condensates are dissolved. Since the salts of the comb polymer and condensate are anionic, they are soluble in water up to relatively high concentrations. The solution is a true solution, in which the comb polymer and condensate molecules are dissolved. Thus, the aqueous solution prepared in step c) of the invention is not a particle dispersion. In other words, it is not a latex. Specifically, the solution does not comprise insoluble particles, for example of thermoplastic polymers, such as particles above 1 µm or above 10 nm diameter.

In a subsequent step d), the aqueous solution is spray-dried. Spray-drying is a known method for producing a dry powder from a liquid by spraying in combination with rapidly drying the solution with a hot gas. The process is carried out in a spray-dryer apparatus. The liquid is dispersed with a spray nozzle or an atomizer.

Preferably, the aqueous solution is pre-heated before entering the spray dryer. The spray-drying may be carried out at an inlet temperature between 100 and 300° C., preferably between 150 and 250° C. The outlet temperature may be between 80 and 200° C., more preferably between 120 and 150° C. The resulting powder product may be sieved in order to remove small agglomerates, which might potentially be formed.

According to the inventive process, a dry powder is obtained, which has a good flowability. This was surprising, because the comb polymer itself, i.e. the polycarboxylate esters or ethers, is not spray-dryable from aqueous solutions. When attempting spray-drying aqueous solutions of comb polymers without condensate additives, at best wax-like products were obtained.

In preferred embodiments of the invention, the solid dispersant is a powder. The powder may be converted into another solid forms, for example by pressing. Thus the inventive solid dispersant may also be a granulate, a shaped block, a tab or the like.

In a preferred embodiment of the invention, the aqueous solution, before spray-drying, comprises
 i. 5 to 60%, preferably 10 to 30%, (w/w) first polymers,
 ii. 5 to 60%, preferably 10 to 30%, (w/w) second polymers, and
 iii. 20 to 80%, preferably 40 to 80, (w/w) water.

The aqueous solution may comprise other soluble additives. Usually, solutions of the respective comb polymers and condensates comprise small amounts of additives. Additives may be residual chemicals or side products from the production process, or substances which stabilize comb polymer solutions. For example, the additives might be salts, especially buffer salts, alcohols, polysaccharides or sulfonate salts. The additives might be functional additives, such as antifoaming agents or colorants. Preferably, the content of solid additives is below 10 weight %, more preferably below 5 weight % or below 3 weight %.

Preferably, the (w/w) ratio of the first polymer and the second polymer in the spray-dried aqueous solution is between 2 to 1 and 1 to 2, more preferably between 1.5 to 1 and 1 to 1.5, or between 1.2 to 1 and 1 to 1.2. In a specific preferred embodiment, the ratio is about 1 to 1 (about equal).

In a preferred embodiment, the pH of the spray-dried aqueous solution is between 5 and 9, more preferably between 6 and 8. The aqueous solution for spray-drying may be obtained by admixing a solution of the first polymer, having at a pH between 2 and 7, preferably between 3.5 and 6.5, with a solution of the second polymer, having a pH between 8 and 14, preferably between 10 and 13; without further adaptation of the pH prior to spray drying.

In a preferred embodiment, the aqueous solution for spray drying is prepared by mixing aqueous solutions of the first polymer and the second polymer. Preferably, the aqueous solution for spray-drying is prepared at a temperature between 15° C. and 40° C., preferably at room temperature. Preferably, the aqueous solution is pre-heated before spray-drying, for example to a temperature between 50° C. and 80° C.

Another subject of the invention is a solid dispersant for a hydraulically binding composition, wherein the solid dispersant is obtainable by the inventive process.

In a preferred embodiment of the invention, the solid dispersant of the invention comprises
I. 5 to 95%, preferably 25 to 75%, (w/w) first polymers and
II. 5 to 95%, preferably 25 to 75%, (w/w) second polymers,
wherein the total amount of polymers i. and ii. is at least 80% or at least 90%, preferably at least 95% (w/w).

In another preferred embodiment of the invention, the solid dispersant of the invention comprises
I. at least 10%, preferably at least 20%, (w/w) first polymers and
II. at least 10%, preferably at least 20%, (w/w) second polymers,
wherein the total amount of polymers i. and ii. is at least 80% or at least 90%, preferably at least 95% (w/w).

Preferably, the solid dispersant is in the form of a fine powder. The inventive spray dried powder has a unique microstructure, which is distinct from that of conventionally dried PCEs and confers advantageous properties to the powder.

By spray drying, a very fine powder is obtained easily. Preferably, the overall particle size of the spray-dried powder (of at least 98% of the particles) is below 700 μm, preferably below 500 μm, or more preferably below 250 μm. The particle size can be measured by laser diffraction, preferably with a Mastersizer 2000 device (trademark of Malvern Instruments Ltd, GB).

In a preferred embodiment, the average particle size (d50%) is between 40 μm and 100 μm, more preferably between 60 μm and 80 μm. Commercially available dried PCE products have higher mean particle sizes, for example between 100 μm and 400 μm. The average particle size can be measured by laser diffraction, preferably with a Mastersizer 2000 device (trademark of Malvern Instruments Ltd, GB).

In contrast, conventional PCE powders are prepared by slow water depletion and tend to have larger particles. For example, solid PCE powders, which are available under the trademark Viscocrete 125 or 111 from Sika, CH, have average particle sizes of about 370 and 140 μm. Thus the inventive powder has a high powder flow and can be admixed homogeneously with other components, such as a mortar.

Preferably, the pH of the inventive dispersant is between 5 and 9, more preferably between 6 and 8, for example about 7 (measured in 4% (w/w) aqueous solution). In comparison, dried PCE products have pH values between 3 and 4. For example, dry PCEs available under the trademark Viscocrete 125 or 225 from Sika, CH, have pH values of about 3.8 and 3.2. The pH-neutral inventive dispersant does not significantly alter the pH of a composition, such as a mortar. The neutral pH is also expected to confer to the polymer an increased long time storage stability.

Further, spray-dried particles typically have a unique microstructure, which is distinct from particles dried by other methods, such as slow water depletion. Usually, spray dried particles resemble spheres. In contrast, conventionally dried PCE particles, such as VC 125 and VC 111, have predominantly amorphous shapes with irregular edges and corners.

In addition, spray dried particles have a relatively low density. Specifically, they tend to have a relatively low density in the interior and outer sections of relatively higher density. Spray dried particles thus resemble "hollow spheres" to a certain extent. For example, the overall bulk density of the inventive powder is between 0.4 and 0.75, specifically between 0.5 and 0.7. In comparison, the bulk density of VC111 is about 0.78 and of VC125 is about 0.81. The bulk density can be measured manually or automatically, for example applying 10 taps, or preferable until constant values are obtained. It is believed that the overall structure and small particles size mediate rapid and even dissolving in water, whereas aggregation and clumping are avoided.

Another subject of the invention is the use of an inventive solid dispersant as a dispersant for a hydraulically binding composition, preferably as a fluidizer. In a preferred embodiment, the use is for increasing the flow of the hydraulically binding composition, more preferably after at least 30 min or at least 60 min after preparation of the mortar composition.

Preferably, the hydraulic binder composition is cement, for example a Portland cement. The hydraulic binder may also be gypsum or lime. The hydraulic binder composition may comprise other known additives, such as fillers.

The inventive process and solid dispersant solve the above-mentioned problems. The invention provides a simple and efficient process for the production of dry solid dispersants comprising comb polymers. The sole additive required is a polymer fluidizer. The solid dispersant composition of the invention is an efficient fluidizer. The inclusion of other additives, such as inorganic salts or reducing agents, which could detrimentally affect the properties of the hydraulically binding composition, is not necessary. Moreover, specific chemical modifications of the comb polymers are not necessary and the solid dispersant may comprise any desired PCE comb polymer.

The dry solid dispersant is available as a fine powder having a high powder flowablity and low water content. It can be dissolved rapidly and homogeneously in water. Thus, the workability is good. It can be stored and transported economically, compared to liquid comb polymer solutions, which usually comprise about 60 wt. % water.

The inventive dispersant is an efficient fluidizer. The fluidizing properties in a cement composition are comparable to those of other PCEs and better than those of melamine sulfonate formaldehyde condensate alone, especially after extended times, such as 30 min or 60 min after mortar preparation. The first and second polymers can be adapted towards each other, such that solid dispersants with specific desired properties are obtained.

EXAMPLES

Example 1

Figure 1:
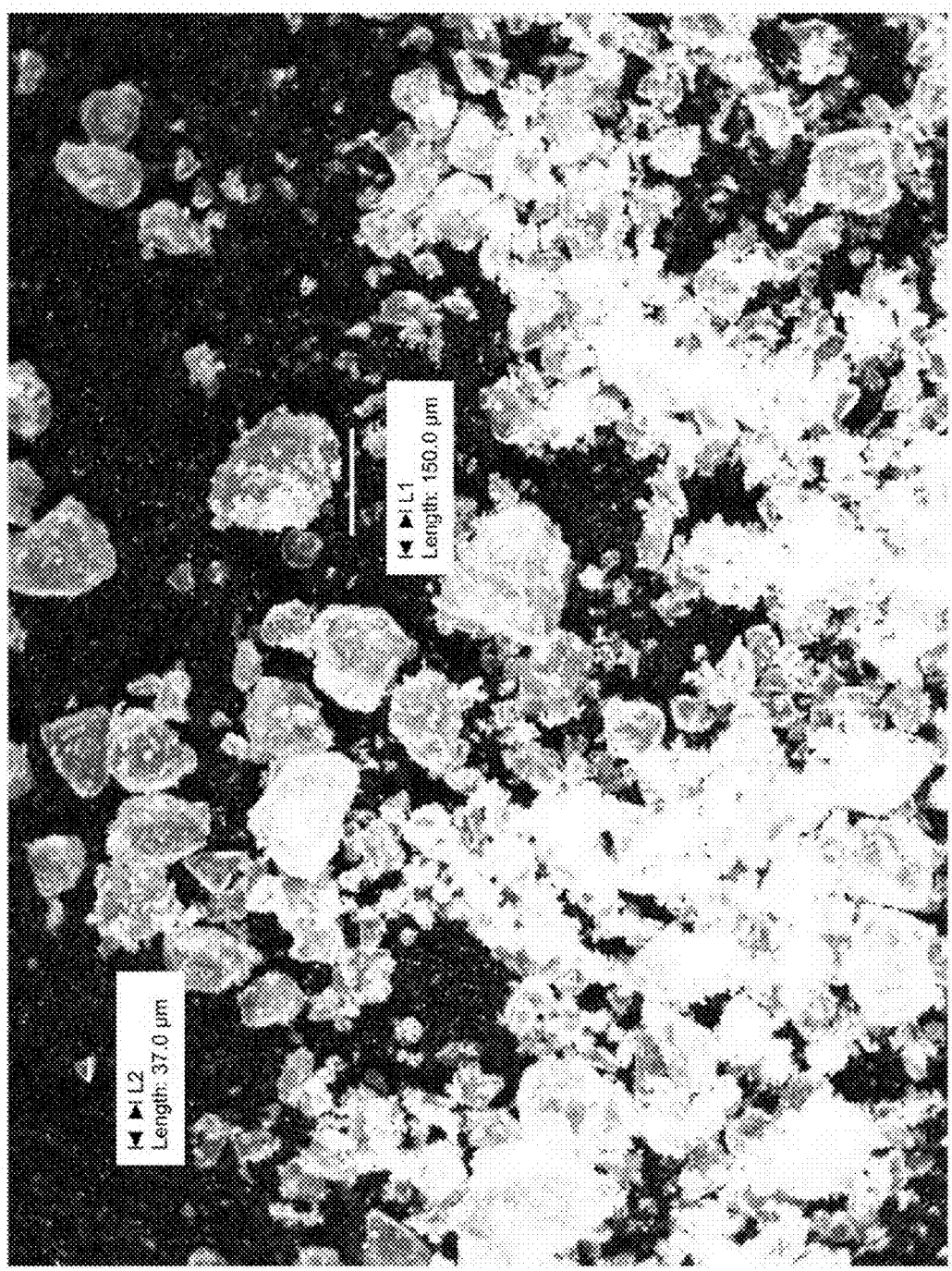
FIG. 1 shows a stereoscopic image of a powder of dry PCE of the state of the art of the trademark Viscocrete 111, Sika, CH. Two length distances are marked as L1 (150.0 μm) and L2 (37.0 μm).

Production of a Solid Dispersant 500 kg Sikament R-550C (trademark of Sika, CH), a polycarboxylate of comb class with a polyacrylic backbone and a PEG side chain combined by an ester, Mw about 21500, 40% s.c., pH 5.5-6.5, was mixed with 500 kg Sikament FF-86 (trademark of Sika, CH), a sulfonated melamine formaldehyde (SMF) resin at 40% s.c., pH 10-13, at room temperature (25° C.) in a conventional reactor of 1.5 m$^3$ capacity with a paddle stirrer for 20 minutes until a homogenous mixture has been obtained. This mixture was slightly heated to 60° C. to decrease viscosity and energy costs during spray drying. Spray drying was performed at 200° C. inlet temperature and 120-150° C. in outlet (using air heated). The resulting product passed through a sieve to separate eventually formed waxy or syrupy parts (<1% w/w). The final spray-dried product can be stored within 25 kg coated bags for about 1 year.

Example 2

Production of a Solid Dispersant 200 kg Viscocrete PC-2 (trademark of Sika, CH), a polycarboxylate and comb polymer with a polymethacrylic backbone and a PEG side chain attached by an ether bond, 50% s.c., pH 3.5-5.5, was mixed with 800 kg Sikament FF-86, a sulfonated melamine formaldehyde (SMF) resin at 40% s.c., pH 10-13, at room temperature (25° C.) in a conventional reactor of 1.5 m$^3$ capacity with a paddle stirrer for 20 minutes until a homogeneous mixture has been obtained. This mixture was slightly heated to 60° C. to decrease viscosity and energy costs during spray drying. Spray drying was performed at 200° C. inlet temperature and 120-150° C. in outlet (using air heated). The final spray-dried product can be stored within 25 kg coated bags for about 1 year.

Examples 3 to 8

Determination of Flow and Mechanical Properties of Mortar Compositions

Mortar compositions were prepared with various PCEs and PCE compositions. The cement used was Portland pozzolanic cement (Cement Melon Plus) with a ratio cement:aggregates of 1:3. Mortar flow tests were carried out according to ASTM C1437 standard test method for flow of hydraulic cement mortars. The flow of the standard mortar, without addition of PCE, was 10-12 cm. In inventive examples 3 and 8, spray-dried dispersant compositions prepared according to example 1 were used. In comparative examples 4 to 7, commercially available powder PCEs were added (Trademark Viscocrete, Sika, CH). The fluidizers and conditions are shown in table 1. W/C is the water content and A/C is the PCE content of the mortar compositions (in weight-%, respectively).

The results are summarized in table 1. The inventive solid dispersant is referred to as "spray dried PCE". The results show that spray dried PCEs have good dispersant properties. The initial flow or the mortar compositions is similar to that of comparative powder PCEs. At 30 min and 60 min, the mortar compositions comprising spray dried PCEs are able to maintain their flow. This finding was surprising, because melamine sulfonate formaldehyde condensates are known to decrease the flow of mortar compositions after 30 min or 60 min.

The mechanical properties of the mortars were examined in standard test method for compressive strength according to ASTM C109-C109M (tests 1, 2 and 3). The results are summarized in table 1. The results show that mortars with spray dried PCEs have improved compressive strength.

Examples 9 to 11

Water Reduction Capacity

The doses of PCE in inventive compositions (ex. 10, 11) and a comparative composition without PCE (ex. 9) were adjusted to a flow of 19 cm to observe their water reduction capacity. The conditions and results are summarized in table 2. The results show that the water content can be considerably reduced with the inventive solid dispersant.

TABLE 2

Summary of conditions and results of examples 9 to 11

| Ex. | Sample | Dosage [%] | W/C | Flow [cm] | W/C respect to plain [%] |
|---|---|---|---|---|---|
| 9 | standard (without PCE) | 0.0 | 0.79 | 19.3 | 100.0 |
| 10 | spray dried PCE | 0.5 | 0.69 | 19.4 | 87.3 |
| 11 | spray dried PCE | 1.0 | 0.63 | 19.3 | 79.7 |

Example 12

Structural Analysis

Figure 2:
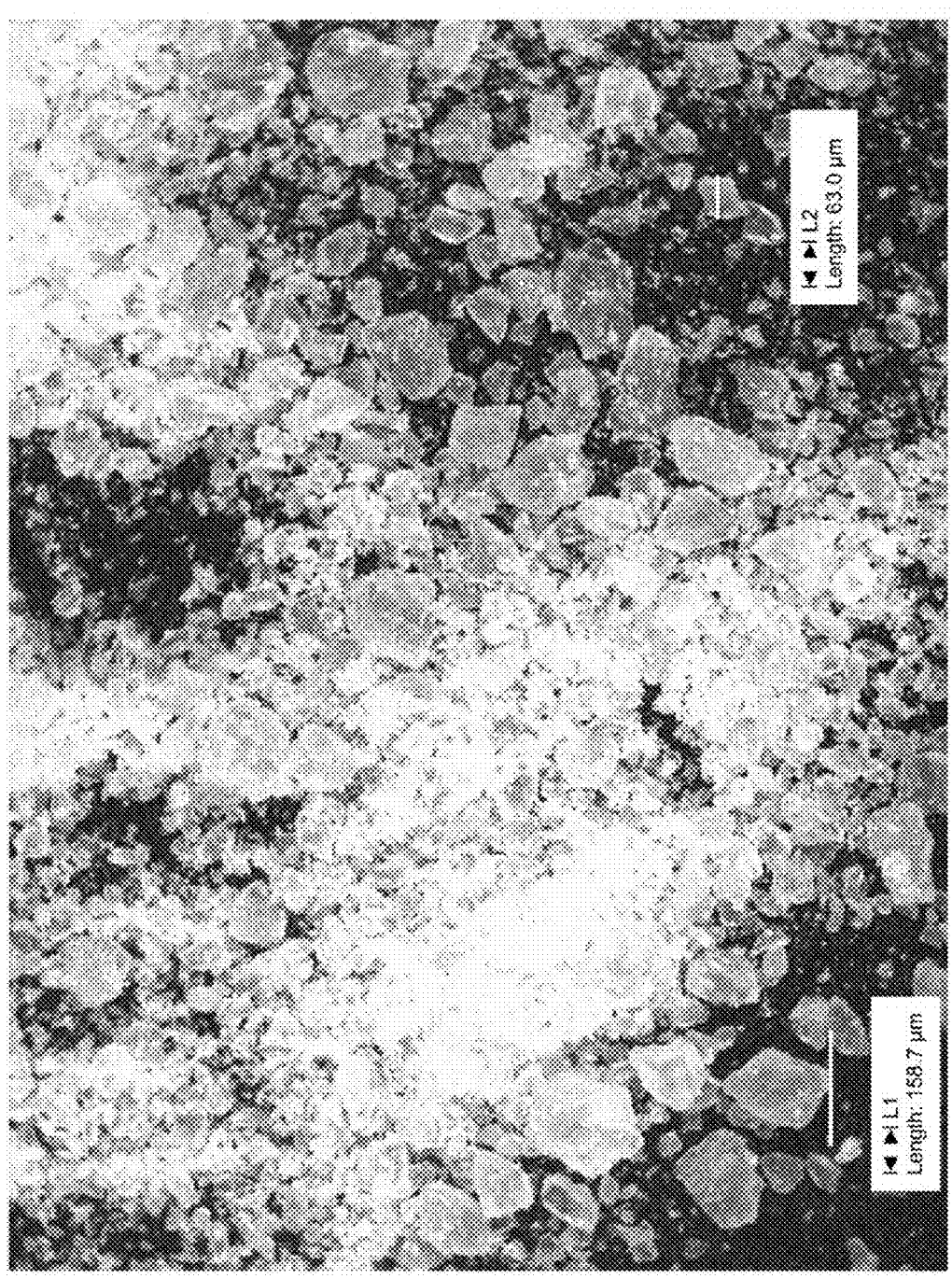
FIG. 2 shows a stereoscopic image of a powder of dry PCE of the state of the art of the trademark Viscocrete 125, Sika, CH. Two length distances are marked as L1 (158.7 μm) and L2 (63.0 μm).
Figure 3:
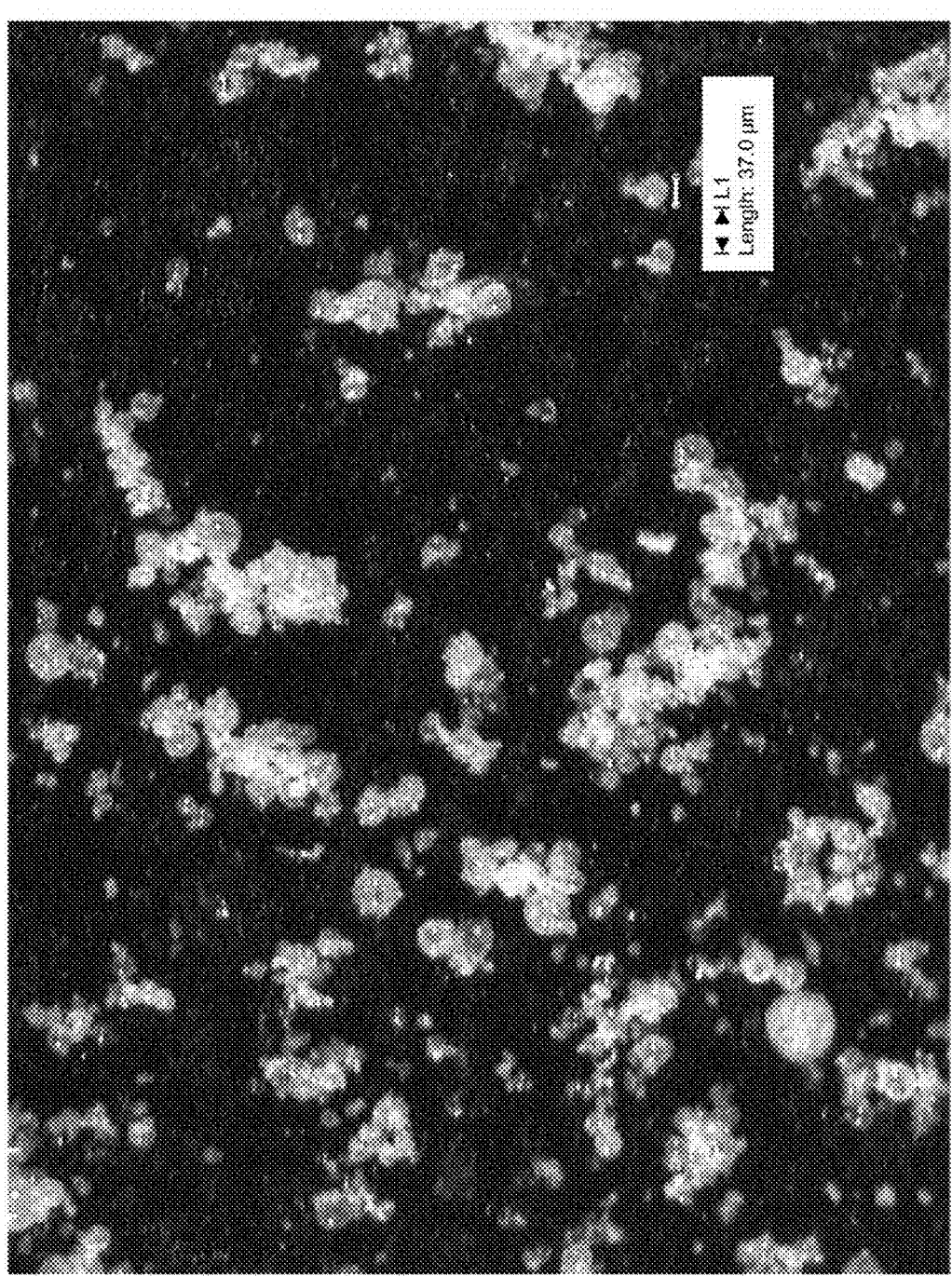
FIG. 3 shows a stereoscopic image of an inventive powder. A length distance is marked as L1 (37.0 μm).

Two dried PCE preparations according to the state of the art (Viscocrete 111 and 125) and an inventive spray dried powder were examined under the stereoscopic microscope. The results are shown in FIGS. 1 to 2 (conventional powders) and FIG. 3 (inventive powder). The inventive particles are smaller and approximately spherical in shape. In comparison, the conventional particles are larger and rather of amorphous shapes with edges and corners. The results show that the inventive powder has a unique microstructure.

The invention claimed is:

1. A process for the production of a solid dispersant for a hydraulically binding composition, comprising the steps of
   a) providing at least one first polymer, which is a comb polymer having a polymer backbone comprising carboxyl groups,
   b) providing at least one second polymer, which is a condensate of, at least, an aromatic compound and formaldehyde; or a lignosulfonate,
   c) preparing an aqueous solution comprising the first and the second polymer, and
   d) spray-drying the aqueous solution to obtain the solid dispersant,

TABLE 1

Summary of conditions and results of examples 3 to 8

| Ex | PCE | W/C | A/C | Flow [cm] 0 min | Flow [cm] 30 min | Flow [cm] 60 min | $\sigma_c$, [Kgf/cm$^2$] 1 d | $\sigma_c$, [Kgf/cm$^2$] 7 d | $\sigma_c$, [Kgf/cm$^2$] 28 d |
|---|---|---|---|---|---|---|---|---|---|
| 3 | spray-dried PCE powder | 0.55 | 0.5 | 21.5 | 20.5 | 20.5 | 64 | 260 | 337.6 |
| 4 | PCE powder (Viscocrete 111) | 0.55 | 0.5 | 24 | 24 | 22.5 | 52 | 276 | 335.5 |
| 5 | PCE powder (Viscocrete 125) | 0.55 | 0.5 | 25.5 | 24 | 23 | 57 | 279 | 325.3 |
| 6 | PCE powder (Viscocrete 125) | 0.55 | 0.5 | 25.5 | 24 | 22.5 | 19.2 | 250 | none |
| 7 | PCE powder (Viscocrete 111) | 0.55 | 0.5 | 22.5 | 18.3 | 17 | 26.7 | 209 | none |
| 8 | spray dried PCE | 0.55 | 0.5 | 25.5 | 24 | 20 | 40.7 | 232 | none | wherein the particle size of the spray-dried solid dispersant is below 700 μm and the average particle size (d50%) is between 40 μm and 100 μm.

2. The process according to claim 1, wherein the backbone of the comb polymer is a polycarboxylic acid and at least some of the side chains of the comb polymer are polyethers.

3. The process according to claim 2, wherein the side chains of the comb polymer are covalently linked to the polycarboxylic acid backbone by ester, ether and/or amide bonds.

4. The process according to claim 1, wherein the polycarboxylic acid is polyacrylic acid, polymethacrylic acid or a copolymer of acrylic acid and methacrylic acid.

5. The process according to claim 1, wherein the side chains comprise polyethyleneglycol and/or polypropyleneglycol.

6. The process according to claim 1, wherein the average molecular weight (Mw) of the comb polymer is 5,000-150,000 g/mol and/or the average molecular weight of the second polymer is 1,000-50,000 g/mol.

7. The process according to claim 1, wherein the second polymer is a sulfonate.

8. The process according to claim 1, wherein the second polymer is a melamine sulfonate formaldehyde condensate, a naphthalene sulfonate formaldehyde condensate, or a lignosulfonate.

9. The process according to claim 1, wherein the comb polymer and/or the condensate is neutralized or partially neutralized.

10. The process according to claim 1, wherein the aqueous solution, before spray-drying, comprises
 i. 5 to 60% (w/w) first polymers,
 ii. 5 to 60% (w/w) second polymers, and
 iii. 20 to 80% (w/w) water.

11. The process according to claim 1, wherein the solid dispersant is in the form of a powder or granulate.

12. A solid dispersant for a hydraulically binding composition, obtained by a process of claim 1.

13. The solid dispersant of claim 12, comprising
 i. 5 to 95% (w/w) first polymers and
 ii. 5 to 95% (w/w) second polymers,
 wherein the total amount of polymers i. and ii. is at least 90% (w/w).

14. The solid dispersant of claim 12 in the form of a fine powder, wherein the pH is between 5 and 9.

15. A hydraulically binding composition comprising a solid dispersant of claim 12.

16. The process according to claim 1, wherein the second polymer provided in step b) is not phosphatized.

17. The process according to claim 1, wherein the second polymer provided in step b) is not a polycondensation product containing (I) at least one structural unit with an aromatic or heteroaromatic sub-unit and at least one polyether side chain, and (II) at least one phosphated structural unit with an aromatic or heteroaromatic sub-unit.

18. The process according to claim 8, wherein the second polymer is a lignosulfonate.

19. The process according to claim 1, wherein the particle size of the spray-dried solid dispersant is below 250 μm.

20. The process according to claim 1, wherein the average particle size (d50%) is between 60 μm and 80 μm.

21. The process according to claim 1, wherein the average molecular weight (Mw) of the comb polymer is 10,000-100,000 g/mol, and/or the average molecular weight of the second polymer is 2,000-10,000 g/mol.

* * * * *